United States Patent Office 3,256,235
Patented June 14, 1966

3,256,235
TERPOLYMERS AND PROCESSES FOR PRODUCING THEM
Giulio Natta, Giorgio Mazzanti, and Giorgio Boschi, Milan, Italy, assignors to Montecatini Società Generale per l'Industria Mineraria e Chimica, Milan, Italy
No Drawing. Filed June 27, 1957, Ser. No. 668,291
Claims priority, application Italy, June 27, 1956, 9,851/56
15 Claims. (Cl. 260—41)

This invention relates to new, substantially linear, high molecular weight copolymers of a hydrocarbon of the acetylene series with ethylene and at least one higher alpha-olefine, and to processes for producing the new copolymers.

The products of this invention are made by copolymerizing mixed monomers consisting of ethylene, an acetylenic hydrocarbon of the formula $CH \equiv CR$ in which R is hydrogen or an alkyl or aryl radical containing up to 8 carbon atoms, and at least one alpha-olefine of the formula $CH_2=CHR$ in which R is an alkyl, aryl or cycloalkyl radical containing from 1 to 16 carbon atoms, in an inert hydrocarbon solvent and with the aid of certain specific, selected catalysts of the type obtained by reacting an organometallic compound of a metal of the 1st, 2nd or 3rd group of the Periodic Table with a compound of a transition metal of groups IV to VI of the Periodic Table.

The selected, specific catalyst is one obtained by reacting the organometallic compound with a transition metal compound which is soluble in the inert hydrocarbon solvent used as the polymerization medium.

The new products of the invention are true copolymers (terpolymers) containing units derived from all of the monomers in the macromolecule and which contain double bonds in the main chain, have a high molecular weight (above at least 1000 and up to 100,000 or even higher) and which are substantially free of homopolymers of the individual monomers contained in the starting mixture.

That the products of the invention are true copolymers essentially free of the homopolymers and containing double bonds in the main chains is established by various findings we have made in connection with them, including the fact that the polymerizates we obtain can be vulcanized by conventional methods of vulcanizing such unsaturated materials, and also by various chemical and physicochemical examinations we have carried out on the products.

For example, we have compared the results we obtain by polymerizing acetylene with the aid of the catalysts aforementioned with the results we obtain by polymerizing the present monomer mixtures with the aid of those catalysts.

When pure acetylene is polymerized in the presence of these catalysts, a homopolymer is produced which can be partially extracted from the crude polymerizate with warm acetone. The residue of the acetone extraction is completely insoluble in ether, heptane, carbon tetrachloride, benzene, toluene and in all of the usual organic solvents. That residue consists of a black, powdery solid which is crystalline under the X-rays. The acetone-soluble portion of the polymer consists of low molecular weight oily products and an infra-red examination thereof reveals the presence of aromatic rings.

On the other hand, when the polymerizate obtained according to the present invention from a mixture of ethylene, propylene and acetylene, is treated with boiling solvents in an atmosphere of nitrogen and using, successively, acetone, ether, heptane or carbon tetrachloride, most of the product is dissolved in one or the other of the solvents and there is substantially no residue.

The acetone extract consists of a sticky, solid product the infra-red spectra of which do not indicate the presence of aromatic rings, but reveal that bands due to sequences of methylene groups, the band of the single, non-terminal methyl group, and the band of the double bonds at 6 microns are present.

The products obtained by extracting the residue of the acetone extraction with ether and then with n-heptane or carbon tetrachloride consist of amorphous solids having the appearance of non-vulcanized elastomers. The presence of double bonds in the main chains of those fractions can be ascertained by determining the iodine number, using the procedure described by Gallo, Wiese and Nelson [Ind. Eng. Chem. 40, 1277 (1948)] or by infra-red analysis.

Since the acetylene homopolymer which is produced when the catalyst prepared from the metallorganic compound and hydrocarbon-soluble compound of the transition metal is used is insoluble in the solvents mentioned, the presence of the double bonds (unsaturation) in the present products can only be explained by the fact that the products contain units derived from acetylene which are copolymerized with both ethylene and propylene.

In addition to the band at 6 microns and attributable to the presence of non-trans double bonds, the infra-red spectrum of the fractions obtained from the polymerizates resulting from the polymerization of the starting monomer mixture containing ethylene, acetylene, and propylene also reveals, at 10.35 microns, the band corresponding to trans double bonds, which is clearly detectable. At the same position, an absorption attributable to monomeric units of propylene is observable. However, in the spectra of the copolymers containing acetylene, the band at 10.35 microns has a higher relative intensity than the band attributable to methyl groups at $8.6\mu$. This is directly contrary to what is observed for polymers which do not contain trans double bonds.

In the infra-red spectrum of the present copolymers, bands at 8.63–8.69 microns (attributable to single internal methyl groups) and bands between 13.6 and 13.9 microns (attributable to sequences of methylene groups) are also observed.

The presence of monomeric units derived from acetylene and combined in the form of a copolymer in the solvent-extractable fractions of the polymerizate obtained from a starting mixture of the monomers acetylene, ethylene and propylene, has also been established by using, in the starting mixture, acetylene labeled with 14C carbon, and then determining the radioactivity of the fractions by means of a Geiger counter.

The presence of conjugated double bonds in the chains of the present copolymer is further indicated by the color of the ether-extractable fractions of the polymerizate obtained from the mixtures of ethylene, propylene, and acetylene, which is generally yellow even in solution, and by the violet color of the heptane-extractable fraction of the polymerization product.

The residue remaining after extraction of the ether extraction residue with n-heptane or carbon tetrachloride is generally small in quantity. It is a plastic, solid, black-violet product which is amorphous under the X-rays. It is different, therefore, from the residue remaining after extraction of homopolymers of the three monomers (polyethylene, polyacetylene, polypropylene). The residue of the homopolymer extraction is clearly crystalline under the X-rays. It can be assumed that the residue remaining after extraction of the present polymerizate with the indicated solvents is also a copolymer. The I. R. spectrum of the residue shows the bands attributable to the unsaturation and the bands attributable to methylenic groups and to methyl groups. However, bands attributable to the presence of crystalline homopolymers are not detected.

When the product obtained from a starting monomer mixture consisting of phenylacetylene, ethylene and propylene is examined, similar results are noted.

When a phenylacetylene homopolymer obtained with the aid of catalysts prepared from the organometallic compound and transition metal compound is extracted successively with acetone, ether, carbon tetrachloride and benzene, it is found to be extractable only with acetone and benzene. In contrast, when the products obtained by copolymerizing acetylene-ethylene-propylene mixtures in accordance with this invention, are extracted with those solvents, fractions extractable with ether and other fractions extractable with n-heptane or carbon tetrachloride are obtained and are found to be colored and to be amorphous under the X-rays. In the infra-red spectrum of those fractions, the phenyl group bands between $13.2\mu$ and $14.35\mu$, and the unsaturation band at $6\mu$, can be seen in addition to the bands attributable to the methyl groups and the bands attributable to the sequences of methylenic groups.

It is surprising that the copolymers of this invention can be obtained in a condition in which they are substantially free of homopolymers.

In previous work with the polymerization of mixtures containing acetylene, and as disclosed in the pending application of G. Natta et al., Ser. No. 592,799, filed June 21, 1956, and now abandoned, it was found that when a mixture of a hydrocarbon of the acetylene series and an alpha-olefine as defined herein (no ethylene present in the starting monomer mixture) was polymerized in an inert hydrocarbon solvent and with the aid of catalysts containing alkyl-metal bonds and prepared, for example, by reaction of an alkyl aluminum compound with a halide of a transition metal of groups IV to VI of the Periodic Table, the crude polymerizate obtained consisted, generally, of mixtures of homopolymers of the acetylene hydrocarbon, homopolymers of the alpha-olefine, and copolymers of the two monomers.

The homopolymers can be separated from the copolymers but rather complicated extractions with suitable solvents are required to effect the separation.

We knew that substantially linear, high molecular weight copolymers of ethylene with the alpha-olefines, or of the alpha-olefines with each other, and substantially free of homopolymers of the respective monomers, can be obtained by polymerizing mixtures of those monomers with catalysts obtained by reacting the organometallic compound of a metal of the 1st, 2nd or 3rd group of the Periodic Table, e.g. an aluminum alkyl, with a transition metal compound soluble in the inert hydrocarbon solvent. That is disclosed in the pending application of G. Natta et al., Ser. No. 629,085, filed December 18, 1956. Those copolymers are intermediates for the production of elastomers, after suitable chemical treatment such as chlorosulfonation which tends to introduce into the polymeric chains reactive groups which on vulcanization of the chemically modified copolymers, form bridges between the chains.

However, those catalysts had not been found to influence the copolymerization of mixtures of the acetylenic hydrocarbons and alpha-olefines (no ethylene present in the starting monomer mixture) so that copolymers free or substantailly free of the homopolymers were obtained.

In fact, we have found that if a mixture of acetylene and propylene containing more than 2 mols percent of acetylene is polymerized continuously with a high rate of circulation of the gaseous phase, the polymerizate obtained consists essentially of an acetylene homopolymer, even when the special catalysts prepared from an organometallic compound and a transition metal compound soluble in the inert hydrocarbon is used. If the proportion of acetylene in the acetylene-propylene mixture is reduced to below 2 mols percent, the polymerizate comprises, in addition to the acetylene homopolymer, an acetylene-propylene copolymer in which the amount of combined acetylene is, however, very low, and only about 2.0% by weight.

In contrast, when the starting monomer mixtures of the present invention are used (e.g. those consisting of ethylene, propylene and acetylene) and the mixture is polymerized with the aid of the specific selected catalyst prepared from the organometallic compound and the hydrocarbon-soluble transition metal compound, the copolymer is formed preferentially, and polymerization of the acetylene to a homopolymer is either completely inhibited or minimized so that the proportion thereof in the polymerizate is negligible, even when the amount of acetylene in the starting mixture is greater than 2.0 mols percent.

It is certainly surprising that when the monomer mixture consists of acetylene and an alpha-olefine the polymerizate is heterogeneous and always contains homopolymers mixed with the copolymers, while if ethylene is present in the starting monomer mixture, in a suitable concentration, the production of copolymers is favored. In the presence of the ethylene it is possible in practice to obtain copolymers free or, or containing only small amounts of homopolymers of the acetylene hydrocarbon whereas, in the absence of ethylene, and because of the high rate of reactivity of the acetylene hydrocarbon, the homopolymer of the latter is produced and, in some cases constitutes the bulk of the polymerization product.

The present invention therefore comprises the method for polymerizing mixtures of ethylene, an acetylenic hydrocarbon, and at least one alpha-olefine, preferably in an inert hydrocarbon solvent and with the aid of the specially selected catalysts, and provides new polymerizates which consist essentially of the three monomers (ethylene, acetylenic hydrocarbon, alpha-olefine) which contain double bonds in the main chains and are vulcanizable to yield elastomers having commercially important properties.

The production of homogeneous copolymers of the ethylene, acetylenic hydrocarbon, and alpha-olefine is particularly favored if the catalyst used is prepared from an organometallic compound, especially aluminum, containing alkyl groups having a fairly long chain and a liquid compound of the transition metal which is soluble in the inert hydrocarbon and which, when reacted with the organometallic compound, yields a catalyst which is readily dispersible or soluble in the inert hydrocarbon. For example, excellent results are obtained with a catalyst prepared from trihexyl aluminum and vanadium oxychloride.

As has been mentioned, the new copolymers of this invention are vulcanizable without special chemical treatment and by simply mixing the copolymer with the usual vulcanization aids, such as sulfur. The vulcanized products are rubbers which are no longer soluble in the common solvents.

Either the crude polymerizate, or the fractions extracted therefrom, can be vulcanized. In both cases, the products obtained are insoluble in carbon tetrachloride and in benzene at 50° C., and exhibit the properties of elastic rubbers.

Using the present copolymers as the starting material for the production of the elastomers, it is possible to produce synthetic rubbers of low unsaturation and having a surprisingly high impact resilience. This distinguishes these elastomers from the low-unsaturation hydrocarbon rubbers known heretofore. The products obtained by vulcanizing polymerizates prepared according to the present method have been compared with butyl rubber. The results of the comparison are shown in Table I below.

TABLE I

| Elastomer | Impact resilience (percent Rebound) determined at 25° C. with a Pirelli apparatus | Shore A hardness |
|---|---|---|
| Butyl rubber | 17 | 46 |
| Vulcanization product of the copolymer of Example 3 | 50 | 58 |
| Vulcanization product of the copolymer of Example 7 | 65 | 56 |

These high values for the impact resilience of the present products can be attributed to the fact that the macromolecules of said copolymers have a high mobility which is due to the presence of sequences of methylenic groups which are not sufficiently long to impart crystallinity to the product in the non-stretched state, and is favored by the presence of bonds between CH and $CH_2$ groups (of the type $-CH=CH-CH_2-$).

It is noted that carbon black acts as an active filler in the vulcanization of the products giving elastomers having a higher ultimate strength (see Example 7). It is interesting to observe that the elastomers so obtained show a low initial modulus coupled with a relatively high ultimate strength. In such cases, the stress-elongation diagram is similar to that of elastomers crystallizable under stretching.

The following examples are given to illustrate the invention, it being understood that these examples are not intended as limiting.

Example 1

The apparatus used was designed for carrying out the copolymerization by a continuous process, that is by circulating the monomer mixture through the same apparatus. It consists of a 2000 cc. shaking autoclave in which the mixture is prepared, and of a 1000 cc. vertical autoclave having an inside diameter of 50 mm., flanged at both ends, and provided with a jacket for circulation of heating fluid and with a mechanical stirrer. A mixture of the monomers in the desired amounts is introduced into the first autoclave, which serves as a tank. That autoclave is then heated while stirring to a temperature at which all monomers are gaseous and is connected to the lower head of the reaction autoclave through an expansion valve and a steel coil. The expansion valve is suitably heated by an electric resistance in order to avoid condensation of the monomers.

The lower head of the autoclave is provided with a bored plate in order to obtain a fine subdivision of the gaseous monomer stream into the solvent containing the catalyst.

The non-reacted gases are discharged through the upper head of the reactor and flow thereof is measured by means of a displacement meter. Before introducing the catalyst, the solvent is generally saturated with the monomer mixture at the temperature and pressure at which the reaction is to be carried out.

In the tank autoclave a mixture is prepared, consisting of

| | Percent by volume |
|---|---|
| Ethylene | 10.0 |
| Propylene | 80.0 |
| Acetylene | 2.7 |
| Propane | 7.3 |

The tank is heated up to 160° C. while stirring the mass and the monomer mixture is fed to the reactor, keeping a constant pressure of 5 atm. and flow rate at the outlet of 80 Nl/h.

A solution of 0.018 mol trihexyl aluminum is 250 ml. heptane was previously introduced into the reactor under a nitrogen atmosphere. Once the alkyl aluminum solution has reached the saturation equilibrium with respect to the circulating monomer mixture, a solution of 0.006 mol $VOCl_3$ in 50 ml. heptane is injected into the autoclave.

A monomer stream is continuously passed for 3 hours while stirring and keeping the temperature inside the autoclave between 25° and 30° C., by circulating oil at 25° C. in the external jacket. The feed is then stopped and the reaction product is discharged as a viscous black-violet colored solution. The product is purified from the inorganic products by treatment under nitrogen with aqueous hydrochloric acid and separation of the two phases thus formed.

The heptane phase is successively washed with water and the polymer obtained is coagulated by treatment with an excess of acetone and methanol.

22 g. of a black-violet solid product are thus separated. The solid product obtained is extracted under nitrogen in a Kumagawa extractor with the following series of solvents: acetone, ether and carbon tetrachloride.

The acetone extract corresponds to 10% of the total and consists of a semi-solid sticky copolymer, having a yellow-red color, and the I.R. spectrum of which does not show the bands due to aromatic groups. The methyl group band, the bands arising from sequences of methylenic groups and the unsaturation bands can be seen in the spectrum.

From the infra-red spectrum the following composition by weight can be calculated: ethylene 44%; propylene 40%; and acetylene 16%.

The ether extract corresponds to 63% and consists of a yellow rubbery solid. In the infra-red spectrum of this fraction the bands due to the presence of methyl groups, the bands due to sequences of methylenic groups, and the band of the double bond at 6μ are clearly visible.

From the infra-red spectrum the following composition by weight can be calculated: propylene 70%; ethylene 24%; and acetylene 6%. This fraction shows an intrinsic viscosity in toluene solution at 30° C. of 1.1.

The heptane extract corresponds to 14.5% and consists of a solid violet copolymer having an intrinsic viscosity of 2.7. The infra-red spectrum of this fraction is similar to that shown by the preceding fraction. The extraction residue (12.5%) consists of a black solid product, amorphous under the X-rays which consists of copolymers rich in acetylene as shown by the infra-red examination. The crude product, as well as the different extracts, are vulcanizable.

A specimen obtained from the crude product, mixed with 3% sulfur, 5% zinc oxide, 0.5% Vulcafor MBT and 1% Vulcafor TMT and cured in a press at 160° C. for 30 minutes is then subjected to a 100% elongation at a rate of 25 mm./min.; it returns to its starting dimensions when the stress is released. The impact resilience, determined with a pendulum microapparatus of the Goodyear-Healey type, at an impact rate of 5 cm./sec., is 48% at 25° C. and the hardness, determined with a Pirelli microdurometer, corresponds to a Shore A hardness of 55.

A specimen prepared from the heptane extract, mixed with 3% sulfur, 5% zinc oxide, 0.5% Vulcafor MBT (2-mercaptobenzothiazole; see Von Alphen, "Rubber Chemicals," p. 45, published by Elsevier Publishing Co., 1956) and 1% Vulcafor TMT (tetramethyl thiurame disulfide; see Von Alphen "Rubber Chemicals," supra, p. 39) and cured in a parallel plate press at 60° C. for 30 minutes, when submitted to a tensile test with a rate of separation of the grips of 25 mm./min., shows an ultimate strength of about 2 kg./mm.² and an elongation at break of 700%.

The impact resilience is 58% at 25° C. and the hardness 83 (Shore A). A swelling test carried out in benzene at 50° C. for 24 hours shows that, after curing, the soluble fraction is 6% by weight and the swelling ratio 3%.

If the crude polymer is subjected to an extraction with hot carbon tetrachloride, a black-violet colored fraction is extracted, corresponding to 87% of the polymer subjected to the extraction and having an intrinsic viscosity of 1.6 and an iodine number of 28.

This fraction can be vulcanized as described above and yields a rubber which, after an elongation of 300%, returns completely to its starting dimensions. The swelling ratio in benzene at 50° C. is about 8% and reaches a constant value after about 24 hours.

Example 2

The apparatus described in the preceding example is used. In the tank autoclave a monomers mixture is prepared, corresponding to the following composition by volume—

| | Percent |
|---|---|
| Propylene | 77 |
| Ethylene | 13 |
| Acetylene | 2 |
| Propane | 8 |

A solution of 0.012 mol trihexyl aluminum in 250 ml. n-heptane is introduced under nitrogen into the previously de-aerated reaction autoclave. After saturating this solution with the mixture of the monomers at 25° C. and under a pressure of 5 atm., a solution of 0.004 ml. $VOCl_3$ in 50 ml. n-heptane is introduced.

The monomers mixture is then fed and discharged continuously for 2 hours and 30 minutes with a flow rate of 80 Nl/h., keeping the reactor under a constant pressure of 5 atm. and at temperature between 25° C. and 35° C.

After said time the polymerization product is discharged and purified by treatment with water acidified with hydrochloric acid, as described in preceding examples.

The copolymer obtained is completely coagulated by treatment with acetone and methanol. 21.5 g. of a black-violet solid product are thus obtained. If the product is cured with 4% by weight of sulfur, 5% zinc oxide, 1% Vulcafor ZDC and 0.5% Vulcafor MBT in a roll mill at 50° C. for about 5 minutes, and cured in a press with parallel plates at 160° C. for 30 minutes, a sheet is obtained which, when subjected to a tensile test at a rate of 25 mm./min., shows an elongation at break of 300% and a set at break of 12% as determined according to the A.S.T.M. specifications. The vulcanized product shows a swelling of 9% in benzene at 50° C. The impact resilience is 49% at room temperature. The crude copolymer was extracted with the following series of solvents; acetone, ether and heptane, at their boiling point.

The acetone extract corresponds to 10% of the total and, as its I.R. spectrum shows the unsaturation bands, the bands due to isolated methyl groups and those due to sequences of methylene groups, it can be assumed to consist of a ternary ethylene-propylene-acetylene copolymer.

The ether extract, consisting of 74% of the total, is a solid yellow-brown product having an iodine number of 35 and an intrinsic viscosity of 1.2 (in toluene solution at 30° C.). The fraction soluble in heptane is 7.9% and is a violet-colored, solid copolymer having an intrinsic viscosity of 2.5 and an iodine number of 41.

The residue of the heptane extraction corresponds to 7.9% of the total and consists of a solid fibrous product partially soluble in boiling heptane, having a black-violet color and consisting of a copolymer very rich in acetylene and ethylene. In the infra-red spectrum the bands attributable to sequences of methylenic groups, the bands of the methyl groups and those unsaturation bands at $6\mu$, are clearly detectable.

The X-rays examination does not show the presence of crystallinity due to pure polyacetylene or to polypropylene or polyethylene. As the fractions of the homopolymers of ethylene, propylene and acetylene, insoluble in boiling heptane, are crystalline under the X-rays, it is evident that the extraction residue of the product obtained according to the present example consists of a copolymer.

Example 3

The apparatus described in the preceding examples is used. In the tank autoclave a monomers mixture is prepared which contains—

| | Percent by volume |
|---|---|
| Propylene | 74 |
| Ethylene | 16.5 |
| Acetylene | 2 |
| Propane | 7.5 |

A solution of 0.018 mol trihexyl aluminum in 250 ml. n-heptane is introduced into the reaction autoclave in a dry, oxygen-free atmosphere. This solution is saturated with the monomers mixture at 25° C. under a pressure of 5 atm., and a solution of 0.006 mol $VOCl_3$ in 50 ml. n-heptane is then injected into the autoclave.

The monomers mixture is continuously fed from the tank autoclave and continuously discharged from the reaction autoclave, keeping a constant pressure of 5 atm. for about 4 hours. During this time, the temperature in the reaction autoclave is kept between 25° C. and 30° C.

The autoclave is then discharged and, proceeding as described in the preceding example, 26.5 g. of a solid copolymer having the appearance of a non-vulcanized elastomer are separated.

A sample of the product obtained is extracted with hot solvents using successively acetone and carbon tetrachloride. The acetone extract corresponds to 6% and, on infra-red spectrographic examination, appears to consist of a copolymer having the following composition by weight—

| | Percent |
|---|---|
| Propylene | 30 |
| Ethylene | 60 |
| Acetylene | 10 |

The carbon tetrachloride extract corresponds to 80.5% and consists of a solid product having a rubbery appearance, an intrinsic viscosity of 1.1 and an iodine number of 26.

The bands of the double bonds, of the methylenic groups sequences, and of the methyl groups are clearly detectable in the infra-red spectrum and the following approximate composition can be calculated—

| | Percent |
|---|---|
| Propylene | 72 |
| Ethylene | 24 |
| Acetylene | 4 |

The extraction residue, corresponding to 13.5%, when examined under the X-rays and by infra-red spectrography, appears to consist of a copolymer very rich in acetylene and ethylene. The crude copolymer is cured for 60 minutes in a press with parallel plates at 160° C. after having been mixed from 10 minutes in a roll mill at 50° C. with 4% by weight sulfur, 5% zinc oxide, 7% Vulcafor ZDC and 0.5% Vulcafor MBT.

A specimen obtained from the vulcanized copolymer, subjected to a tensile test at a rate of 25 mm./min., shows an elongation to break of 200%, in ultimate strength of 0.4 kg./mm.$^2$ and a set at break of 10%, determined according to the ASTM specifications.

The impact resilience is 50% at room temperature and the Shore A hardness is 58.

Example 4

In this example radioactive acetylene, obtained from barium carbide, is used. The acetylene thus obtained is successively diluted until a specific activity of 1 millicurie/2.7 mols is obtained. The specific activity is determined on a polymer obtained with catalysts consisting of triethyl aluminum and a titanium alkoxide.

The activity of the solid powdered polyacetylene thus obtained is determined on a thick stratus with a counter having a thin mica window with a thickness corresponding to 2.4 mg./cm.$^2$. The surface area of the circular sample is 1.33 cm.$^2$. All samples of the copolymer are examined under the same geometrical conditions.

The reproducibility is better than 3%.

In the tank autoclave the following mixture of monomers is prepared—

| | Percent |
|---|---|
| Ethylene | 18.4 |
| Propylene | 73.0 |
| Acetylene | [1] 1.7 |
| Propane | 6.9 |

[1] Having the aforementioned specific activity.

and heated to 150° C. while stirring.

A solution of 0.018 mol trihexyl aluminium in 150 ml. heptane is introduced under nitrogen into the reaction autoclave and saturated with the monomer mixture at 25° C. and 5 atm. A solution of 0.066 mol VOCl$_3$ in 50 ml. heptane is then injected and the feeding and discharge of the monomers is continued for 2 hours with a flow of 40 Nl/h.

Proceeding as described previously, 18 g. of a solid rubbery copolymer are then separated, the acetylene content of which is 3.8%, as determined from the radioactivity.

The acetone extract corresponds to 11% of the copolymer and contains 7.4% acetylene, as determined from its radioactivity. The fraction soluble in ether represents 72% of the product, has an intrinsic viscosity of 1.1, as determined in toluene at 30° C., and an acetylene content of 2.5%.

The carbon tetrachloride extract successively obtained corresponds to 11.9%, has an intrinsic viscosity of 1.9 and contains 2% acetylene. The extraction residue, corresponding to 4.9%, has an acetylene content of 20.5%.

*Example 5*

In the tank autoclave a mixture of monomers having the following composition is prepared—

| | Percent by volume |
|---|---|
| Ethylene | 19.0 |
| Propylene | 76.5 |
| Acetylene | 4.5 |

A solution of 0.03 mol trihexyl aluminum in 250 ml. n-heptane is introduced under nitrogen into the reaction autoclave. This solution is saturated with the mixture of the monomers at 5 atm. and 25° C. and a solution of 0.01 mol VOCl$_3$ in 50 ml. n-heptane is then injected into the autoclave. The monomers are then fed and discharged continuously for 2 hours at a flow rate of 60 Nl/h. The product is a syrupy solution which is purified by treatment with aqueous hydrochloric acid. The product obtained is then completely coagulated, filtered and dried under vacuum.

21 g. of a black-violet solid product are obtained, which shows an elastic behaviour when subjected to quick stresses.

The carbon tetrachloride extract, corresponding to 81% of the total product and having an intrinsic viscosity of 1.4, is vulcanized by mixing it with 2% sulfur, 5% zinc oxide, and 1.5% Vulcafor MBT, and heating it to 150° C. in a press for 60 minutes. A specimen of this vulcanized product shows an elongation at break of 400% and an ultimate strength of 0.45 kg./mm.$^2$.

*Example 6*

The following mixture of monomers is prepared in the tank autoclave—

| | Percent by volume |
|---|---|
| Ethylene | 18 |
| Butene-1 | 80 |
| Acetylene | 2 | and heated to 170° C. while stirring. A solution of 0.012 mol trihexyl aluminum in 200 ml. n-heptane is saturated with the mixture of monomers at 5 atm. and 25° C. in the polymerization autoclave. A solution of 0.004 mol. VOCl$_3$ in 50 ml. heptane is then injected. The monomers are fed and discharged continuously at a flow rate of 60 Nl/h. for about 2 hours, keeping the reactor between 25° C. and 35° C. Proceeding as described in the foregoing examples, 18 g. of a solid rubbery product are separated.

The copolymer obtained is extractable for 70% with hot carbon tetrachloride.

The extracted fraction, having an intrinsic viscosity, of 1.2 when examined by infra-red spectography, shows the presence of methyl groups, of sequences of methylenic groups and of unsaturations. The iodine number of this fraction is 41. The fraction soluble in carbon tetrachloride is vulcanized by mixing in a roll mill at 55° C. for 15 minutes, with 3% by weight of sulfur, 5% zinc oxide, 1.3% Vulcafor ZDC, 1% Vulcafor MBT, 1% stearic acid and by thereafter keeping it in a press with parallel plates at 150° C. for 60 minutes.

The tensile test carried out on a specimen obtained from the vulcanized product gives an ultimate strength of 0.5 kg./mm.$^2$ and an elongation of 350%.

The swelling ratio, determined in benzene at 50° C., reaches a constant value of 4.1 after 24 hours.

*Example 7*

A mixture of monomers having the following composition is introduced into the tank autoclave:

| | Percent by volume |
|---|---|
| Ethylene | 18.8 |
| Propylene | 74.0 |
| Propane | 7.2 | and heated to 150° C.

A solution of 0.018 mol trihexyl aluminum in 250 ml. heptane and about 5 g. phenylacetylene are introduced into the reaction autoclave and saturated with the ethylene-propylene mixture at 5 atms. and 25° C. A solution of 0.006 mol VOCl$_3$ in 50 ml. n-heptane is then injected. The ethylene-propylene mixture is continuously fed and discharged at a flow rate of 100 Nl/h. while an n-heptane solution of phenylacetylene is introduced continuously by means of a bellows pump, thus introducing a total of 0.5 mol phenylacetylene in 3 hours.

After said time the reaction product, which is a yellow-orange viscous solution, is discharged.

The product is purified by treatment with hydrochloric acid and complete coagulation with acetone and methanol under nitrogen. 33 g. of ochre-yellow solid copolymer having the characteristics of a non-vulcanized elastomer are thus separated. The product obtained is fractionated by extraction with hot solvents under nitrogen.

The acetone extract corresponds to 5.5% of the total; in this fraction the bands of the phenyl groups, of the unsaturation, of the non-terminal methyl groups and of sequences of methylenic groups are clearly detectable by infra-red spectography.

The carbon tetrachloride extract corresponds to 91.8% and shows an intrinsic viscosity of 3.9 (in tetralin solution at 135° C.). In the infra-red spectrum, the bands of the phenyl groups between 13.2 and 14.35$\mu$, those of the unsaturations at 6$\mu$, the bands of the methyl group and those of 8.63 and 8.69$\mu$ due to sequences of methylenic groups are detectable.

The crude product is vulcanized by mixing in a roll mill at 50° C. for 10 minutes with 4% by weight of sulfur, 5% zinc oxide, 1% Vulcafor ZDC, 0.5% Vulcafor MBT and by heating in a press with parallel plates, at 160° C. for 30 minutes. The tensile tests carried out on standard ASTM D 412–51T specimens, at a testing rate of 25 mm./min. and at 20° C. give an ultimate strength of 0.2 kg./mm.$^2$ and an elongation at break of 660%.

The impact resilience at room temperature is 65% and the hardness (Shore A) is 56.

The fraction extractable with carbon tetrachloride is mixed in a roll mill at 40° C. for 15 minutes with 3% sulfur, 5% zinc oxide, 1% stearic acid, 1.5% Vulcafor MBT and then vulcanized in a press at 150° C. for 90 minutes. A specimen subjected to a tensile test with a rate of 25 mm./min. gives the following characteristics—

Ultimate strength _____kg./mm.$^2$__  0.2
Elongation at break _____percent__  550
Set at break _____do____  30 as determined according to the ASTM specifications. The swelling ratio in benzene at 50° C. reaches the constant value of 5 after 24 hours.

If 10% carbon black MPC is added in the mix, the following characteristics are obtained.

Ultimate strength _____kg./mm.$^2$__  0.75
Elongation at break _____percent__  750
Secant modulus at 200% elongation____kg./mm.$^2$__  0.15
Set at break _____percent__  50

The transition metal compounds used in preparing the selected catalyst which yields, in the presence of ethylene in the starting monomer mix, the copolymers of this invention, include liquid halides of the metals such as vanadium oxychloride and vanadium tetrachloride in which the vanadium is penta- or tetra-valent, titanium tetrachloride, chromium oxychloride ($CrO_2Cl_2$) and the corresponding compounds of other transition metals of the 4th to 6th groups of the Periodic Table. Lyophilic groups, such as long chain alkyl groups, i.e., those having 4 to 16 carbon atoms, and alkoxy groups, even those of relatively short chain length, tend to render the transition metal compound soluble in the inert hydrocarbon. Compounds containing such groups, for instance such compounds as dibutoxy titanium dichloride $$[Ti(OC_4H_9)_2Cl_2]$$

may be used as the transition metal compound.

The organometallic compound may be an alkyl compound of a metal of the 1st, 2nd or 3rd group of the Periodic Table, i.e., an alkyl compound of lithium, beryllium, magnesium, zinc, cadmium and other elements of the 2nd group as well as aluminum and other elements of the 3rd group.

Generally, the liquid transition metal compound is reacted with an organometallic compound containing alkyl groups attached to the metal atom and which contain 4 to 16 carbon atoms. Excellent results have been obtained by using the catalyst prepared directly from trihexyl aluminum and vanadium oxychloride.

A suitable molar ratio of the transition metal compound to the metal alkyl is from 1:0.5 to 1:10 usually preferably from 1:1 to 1:5.

The amount of ethylene contained in the starting monomer mixture may vary and may be from 5% to 30% by volume. The proportion of acetylene or acetylenic hydrocarbon and of alpha-olefine in the starting mixture may also vary. In general the acetylene or acetylene homolog percentage by volume in the starting monomer mixture may be from 1 to 10%, while the alpha-olefine percentage may be from 60 to 90%.

The starting monomer mixture always contains a certain proportion (usually not less than 5%) of ethylene. It also contains as acetylenic hydrocarbon of the formula $CH \equiv CR$, in which R is hydrogen or an alkyl or aryl radical containing up to 8 carbon atoms, and an alpha-olefine of the formula $CH_2=CHR$ in which R represents an alkyl radical of from 1 to 16 carbon atoms.

These ternary monomer mixtures can be polymerized to the true copolymers, preferably in an inert hydrocarbon solvent such as a light gasoline free of olefinic bonds, n-heptane, iso-octane, etc., with the aid of the selected catalysts described herein, at temperatures below 50° C., for example at room temperature, and in general between 25° C. and 35° C., and at a pressure between normal atmospheric pressure and about 20 atmospheres.

The copolymers of the invention contain, in general, by weight in the copolymer molecule, from 20% to 70% of ethylene; from 2% to 15% of the acetylenic hydrocarbon (acetylene or a homolog thereof) the rest being alpha-olefine.

The elastomers obtained by vulcanizing the new copolymers described herein can be formed into shaped articles such as threads, sheets, tubes, foils, etc.

Some changes may be made in practicing this invention without departing from the spirit and scope thereof. It is to be understood, therefore, that it is intended to claim as part of the invention, such variations and modifications as lie within the scope of the invention and of the appended claims, and intended to include within the scope of said claims such changes as may be apparent to those skilled in this art in the practice of the principles of the invention as set forth in this specification.

What is claimed is:

1. New elastic rubbers having an impact resilience higher than butyl rubber and consisting essentially of sulfur-vulcanized substantially linear, solid, amorphous high molecular weight terpolymers consisting, by weight in the terpolymer molecule, from 20% to 70% of ethylene, from 2% to 15% of an acetylenic hydrocarbon having the formula $CH \equiv CR$ in which R is selected from the group consisting of hydrogen and the phenyl radical, and from 15% to 78% of higher alpha-olefin selected from the group consisting of propylene and butene-1; said terpolymers being further characterized in that prior to vulcanization, they contain double bonds in the main chains as shown by the infra-red spectra, and are substantially free of homopolymers.

2. Elastic rubbers according to claim 1, characterized in being sulfur-vulcanized terpolymers of ethylene, propylene and acetylene, which terpolymers have, prior to vulcanization, characteristics as set forth in claim 1.

3. Elastic rubbers according to claim 1, characterized in being sulfur-vulcanized terpolymers of ethylene, propylene and phenylacetylene which terpolymers have, prior to vulcanization, characteristics as set forth in claim 1.

4. Elastic rubbers according to claim 1, characterized in being sulfur-vulcanized terpolymers of ethylene, butene-1, and acetylene, which terpolymers have, prior to vulcanization, characteristics as set forth in claim 1.

5. Elastic rubbers according to claim 1, further characterized in containing carbon black as a filler, showing a low initial modulus coupled with a relatively high ultimate strength, and having a stress-elongation diagram which is similar to the diagram of elastomers which are crystallizable under stretching.

6. A process for copolymerizing ethylene, an acetylenic hydrocarbon having the formula $CH \equiv CR$ in which R is selected from the group consisting of hydrogen and the phenyl radical, and a higher alpha-olefin selected from the group consisting of propylene and butene-1, to obtain terpolymers containing units derived from each of the three monomers in the terpolymer molecule, and which terpolymers contain double bonds in the main chain as shown by the infrared spectra, and are vulcanizable to elastic rubbers having an impact resilience higher than butyl rubber, which process comprises bringing a mixture of, by volume, from 5% to 30% of ethylene, from 1% to 10% of the acetylenic hydrocarbon, and from 60% to 90% of the higher alpha-olefin into intimate contact, at a temperature of from 25° C. to 35° C., under a pressure of from normal atmospheric pressure to about 20 atmospheres, and in an inert hydrocarbon solvent, with a hydrocarbon-dispersible catalyst prepared by mixing (1) a compound of a transition metal selected from the group consisting of hydrocarbon-soluble liquid halides, oxyhalides and alkoxyhalides of tetravalent titanium, tetra- and pentavalent vanadium, and hexavalent chromium, with (2) aluminumtrihexyl.

7. The process according to claim 6, characterized in that the catalyst is prepared by mixing (1) vanadium oxychloride, with (2) trihexyl aluminum.

8. The process according to claim 6, characterized in that a mixture of ethylene, propylene and acetylene is brought into contact with the catalyst.

9. The process according to claim 6, characterized in that a mixture of ethylene, propylene and phenylacetylene is brought into contact with the catalyst.

10. The process according to claim 6, characterized in that a mixture of ethylene, butene-1, and acetylene is brought into contact with the catalyst.

11. The process according to claim 6, characterized in that a mixture of ethylene, butene-1, and phenylacetylene is brought into contact with the catalyst.

12. The process according to claim 6, characterized in that a mixture of ethylene, propylene and acetylene is brought into contact with a catalyst prepared from (1) vanadium oxychloride and (2) trihexyl aluminum.

13. The process according to claim 6, characterized in that a mixture of ethylene, propylene and phenylacetylene is brought into contact with a catalyst prepared from (1) vanadium oxychloride and (2) trihexyl aluminum.

14. The process according to claim 6, characterized in that a mixture of ethylene, butene-1 and acetylene is brought into contact with a catalyst prepared from (1) vanadium oxychloride and (2) trihexyl aluminum.

15. The process according to claim 6, characterized in that a mixture of ethylene, butene-1 and phenylacetylene is brought into contact with a catalyst prepared from (1) vanadium oxychloride and (2) trihexyl aluminum.

References Cited by the Examiner

UNITED STATES PATENTS

| | | | |
|---|---|---|---|
| 2,419,008 | 4/1947 | Coffman et al. | 260—92.1 |
| 2,609,363 | 9/1952 | Welch | 260—80.5 |
| 2,692,258 | 10/1954 | Roebuck | 260—80.5 |
| 2,710,854 | 6/1955 | Seelig | 260—80.5 |
| 2,827,447 | 3/1958 | Nowlin | 260—94.9 |
| 2,879,261 | 3/1959 | Johnson et al. | 260—80.5 |
| 2,879,263 | 3/1959 | Anderson et al. | 260—94.9 |

FOREIGN PATENTS 553,362   5/1955   Belgium.

JOSEPH L. SCHOFER, *Primary Examiner.*

B. E. LANHAM, H. N. BURSTEIN, L. GOTTS, W. H. SHORT, *Examiners.*